(12) United States Patent
Li et al.

(10) Patent No.: US 8,474,769 B2
(45) Date of Patent: Jul. 2, 2013

(54) MOUNTING APPARATUS FOR BACK PANEL

(75) Inventors: Zhan-Yang Li, Shenzhen (CN);
Jian-Jun Xie, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 562 days.

(21) Appl. No.: 12/750,940

(22) Filed: Mar. 31, 2010

(65) Prior Publication Data
US 2011/0155871 A1    Jun. 30, 2011

(30) Foreign Application Priority Data
Dec. 29, 2009    (CN) ............. 2009 2 0319010 U

(51) Int. Cl.
  *G06F 1/16*     (2006.01)
  *H05K 5/00*    (2006.01)
  *H05K 7/00*    (2006.01)

(52) U.S. Cl.
  USPC .............. 248/220.22; 248/918; 361/679.02; 312/223.1

(58) Field of Classification Search
  USPC .......... 248/222.11, 220.22, 221.11, 918; 361/679.31, 679.33, 679.02; 312/223.1, 223.2
  See application file for complete search history.

(56) References Cited

U.S. PATENT DOCUMENTS

| | | | |
|---|---|---|---|
| 5,967,633 A * | 10/1999 | Jung | 312/223.2 |
| 7,142,431 B2 * | 11/2006 | Li et al. | 361/726 |
| 7,589,960 B2 * | 9/2009 | Li | 361/679.33 |
| 7,656,653 B2 * | 2/2010 | Li | 361/679.33 |
| 7,679,934 B2 * | 3/2010 | Fan et al. | 361/807 |
| 7,782,605 B2 * | 8/2010 | Wu et al. | 361/679.39 |
| 7,855,881 B2 * | 12/2010 | Tsai et al. | 361/679.37 |

* cited by examiner

*Primary Examiner* — Steven Marsh
(74) *Attorney, Agent, or Firm* — Altis Law Group, Inc.

(57) ABSTRACT

A mounting apparatus includes a drive bracket assembly, a back panel, and a securing member. The back panel is mounted to the drive bracket assembly along a first direction. The securing member is slidably mounted on the drive bracket assembly. The securing member secures the back panel to the drive bracket assembly to prevent the back panel moving along the first direction. The securing member is capable of sliding along a second direction that is generally perpendicular to the first direction to a position, so the back panel is capable of moving along the first direction.

18 Claims, 5 Drawing Sheets

MOUNTING APPARATUS FOR BACK PANEL

BACKGROUND

1. Technical Field

The present disclosure relates to mounting apparatuses, especially to a mounting apparatus for securing a back panel.

2. Description of Related Art

Generally, a plurality of large data storage devices is needed in a server system. It is well known in the art, that the server system cannot switch off when the data storage devices are being repaired or replaced. The data storage devices are detached and installed/uninstalled from the server system while the server system remains online. A back panel is usually secured to a drive bracket that accommodates the data storage devices. The data storage devices can electrically connect to the back panel when installed in the drive bracket.

Typically in a mounting apparatus for securing the back panel to the drive bracket, a locking plate is provided to hold the back panel. The mounting apparatus has a complicated structure, and the manufacturing cost is high.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
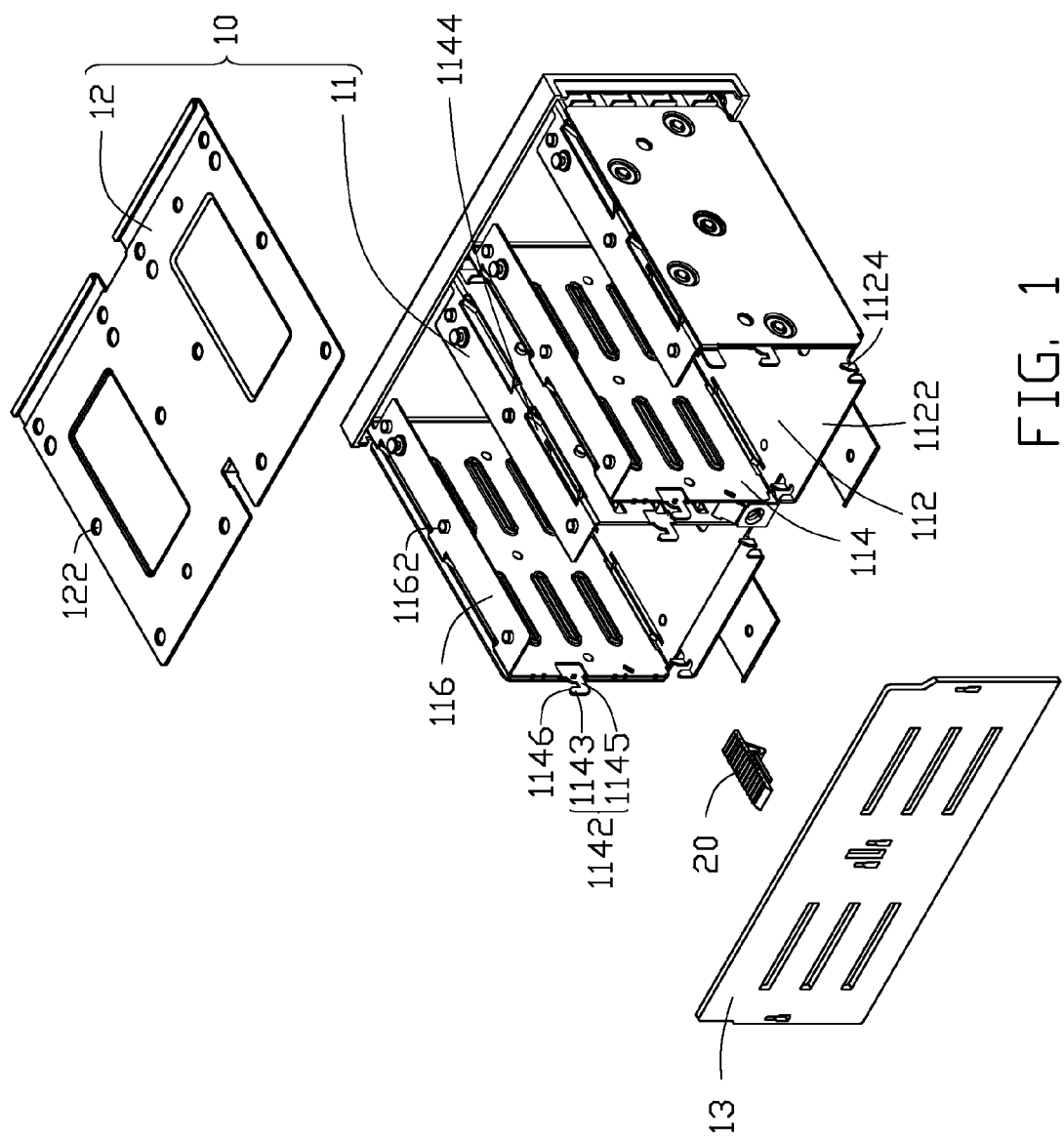
FIG. 1 is an exploded, isometric view of a mounting apparatus in accordance with an embodiment of the present disclosure, together with a back panel, the mounting apparatus including a drive bracket assembly, and a securing member.
Figure 2:
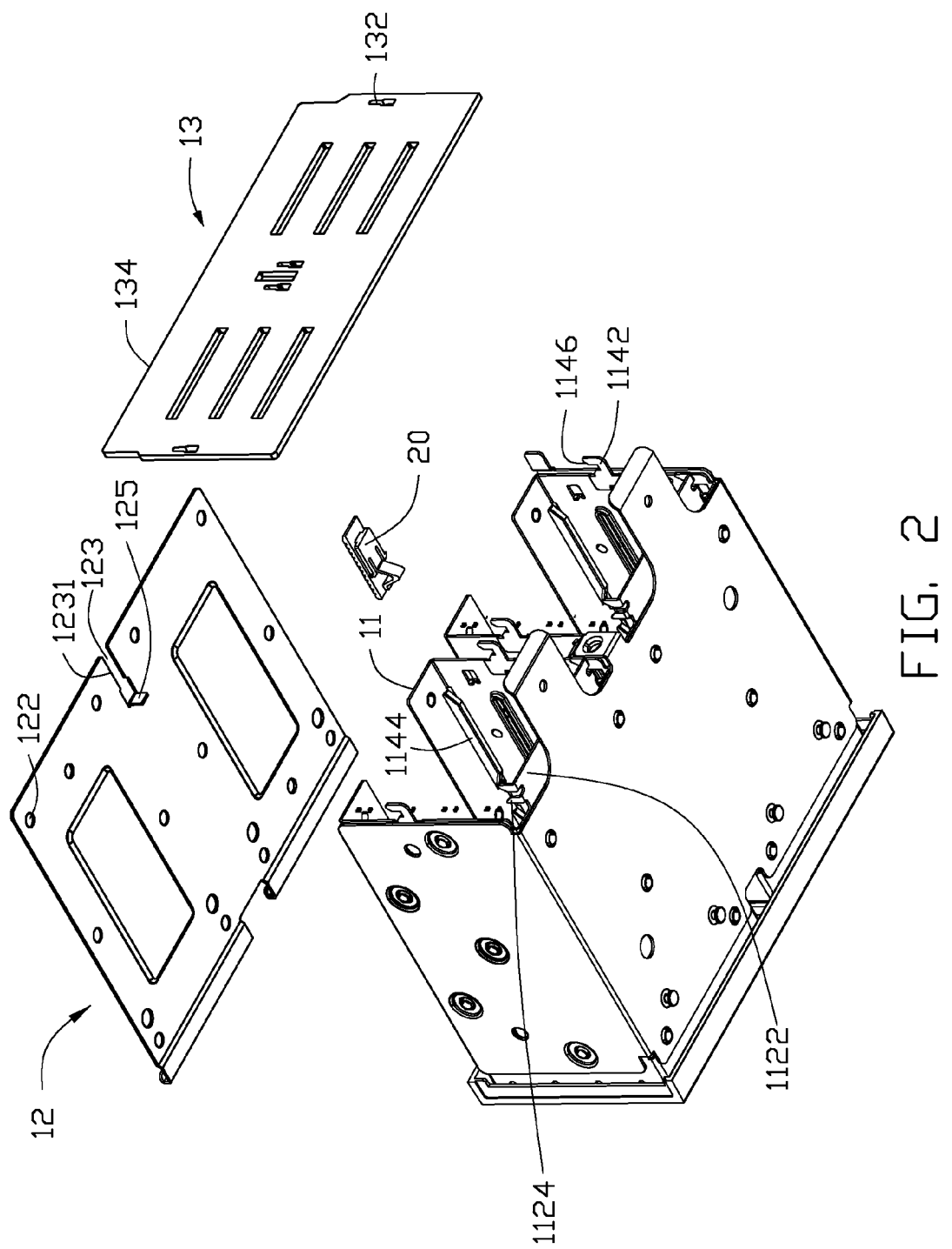
FIG. 2 is similar to FIG. 1, but viewed from another aspect.

Referring to FIGS. 1 and 2, a mounting apparatus includes a drive bracket assembly 10 configured for accommodating devices like data storage devices, a back panel 13, and a securing member 20. The data storage devices can be hard disk drives of a computer system or a server system.

The drive bracket assembly 10 includes a top plate 12 and a pair of brackets 11. Each bracket 11 includes a bottom plate 112 and two side plates 114. The top plate 12 can be parallel to the bottom plate 112. The side plates 114 can be perpendicular to both the top plate 12 and the bottom plate 112, and parallel to each other. A mounting portion 116 perpendicularly extends inwards from a top side of each side plate 114. A plurality of protrusions 1162 protrudes from each mounting portion 116. A plurality of generally L-shaped hooks 1142 is respectively formed at a rear end edge of each side plate 114, extending toward the top plate 12. Each hook 1142 has a shank portion 1145 and a hook portion 1143. The shank portion 1145 substantially horizontally extends from a rear edge of the corresponding side plate 114 for supporting the back panel 13. The hook portion 1143 extends upward from a distal end of the shank portion 1145. The hook portion 1143 has a slanted guiding edge 1146 facing the side plate 114. Two adjacent side plates 114 of the two brackets 11 define a sliding slot 1144 respectively. An extending portion 1122 extends from a rear end edge of the bottom plate 112 of each bracket 11. At opposite ends of the extending portion 1122, respectively, a pair of positioning tabs 1124 are bent upward. Each pair of positioning tabs 1124 defines a positioning opening therebetween. The top plate 12 defines a plurality of through holes 122 for receiving the protrusions 1162 of the mounting portions 116 of the side plates 114. An opening 123 is defined in one side of the top plate 12 adjacent to the back panel 10. A stopper portion 125 extends from one edge of the top plate 12.

The back panel 10 has a plurality of locking openings 132 for engaging with the hooks 1142 of the side plates 114, and an upper edge 134. Each locking opening 132 includes a wide portion and a narrow portion. Each wide portion has a greater width than that of each narrow portion. The width of each narrow portion is generally equal to the thickness of each hook 1142 of the side plates 114.

Figure 3:
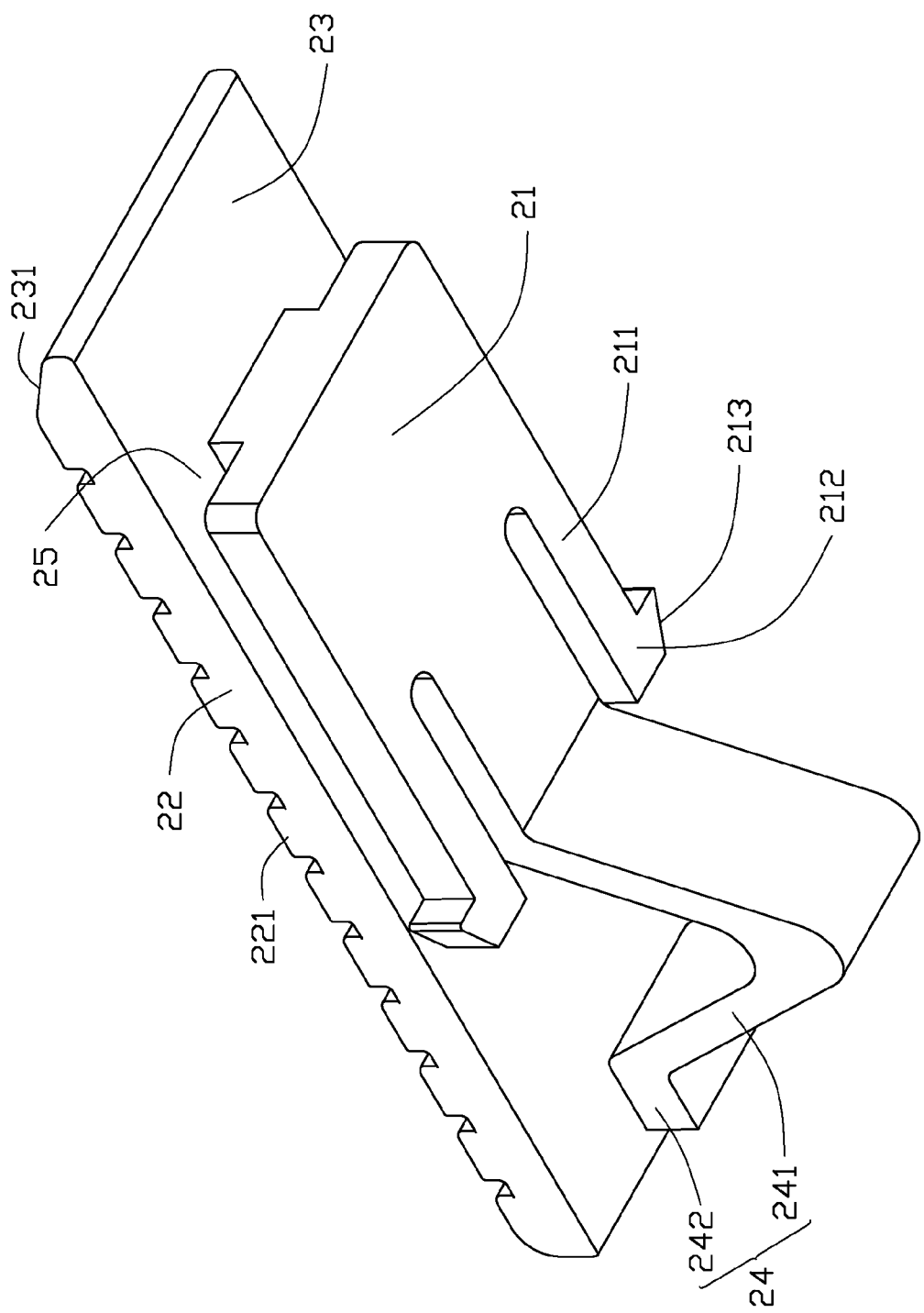
FIG. 3 is an isometric view of the securing member of FIG. 1.
Figure 4:
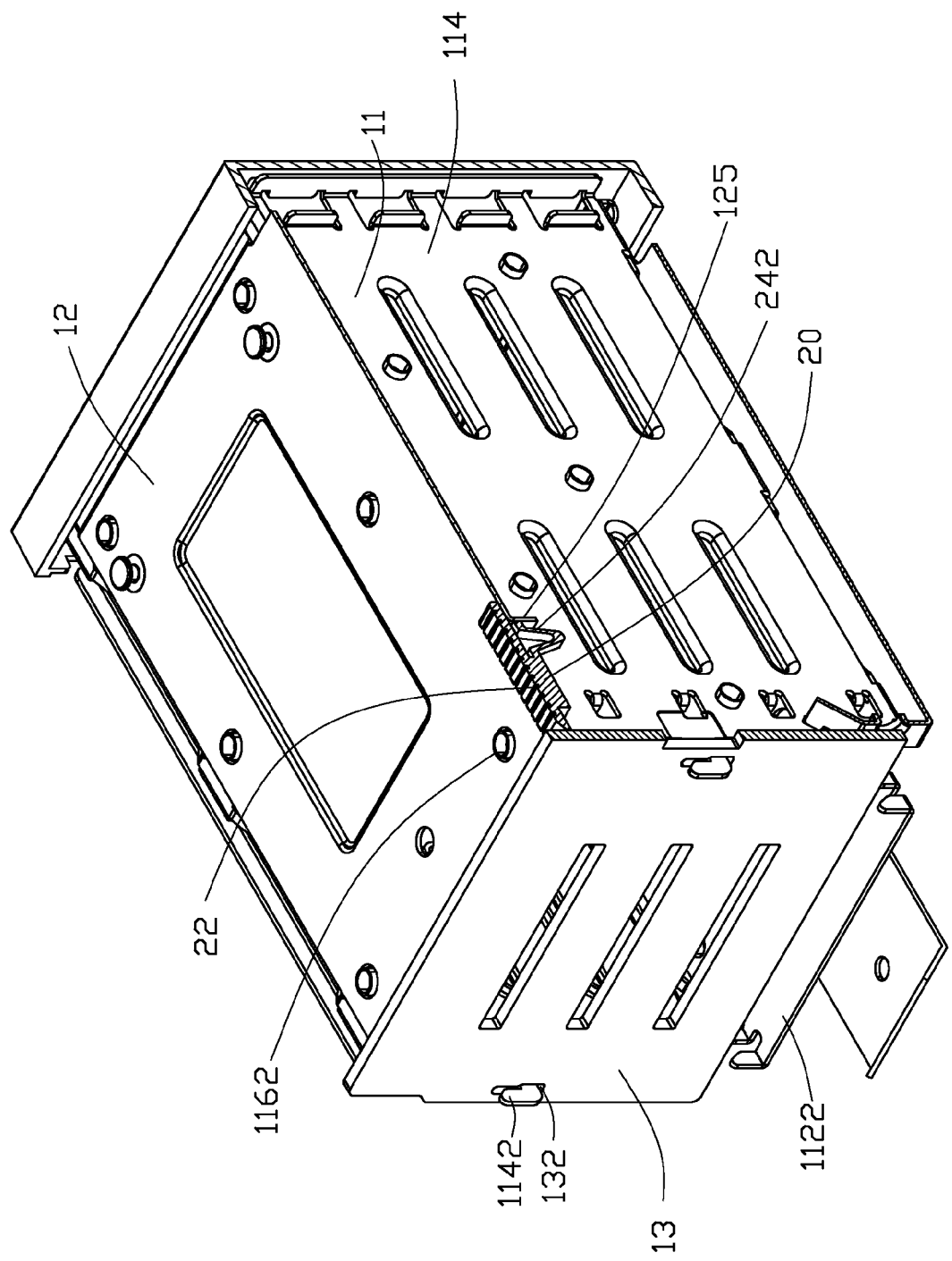
FIG. 4 is a pre-assembled view of the mounting apparatus of FIG. 1.
Figure 5:
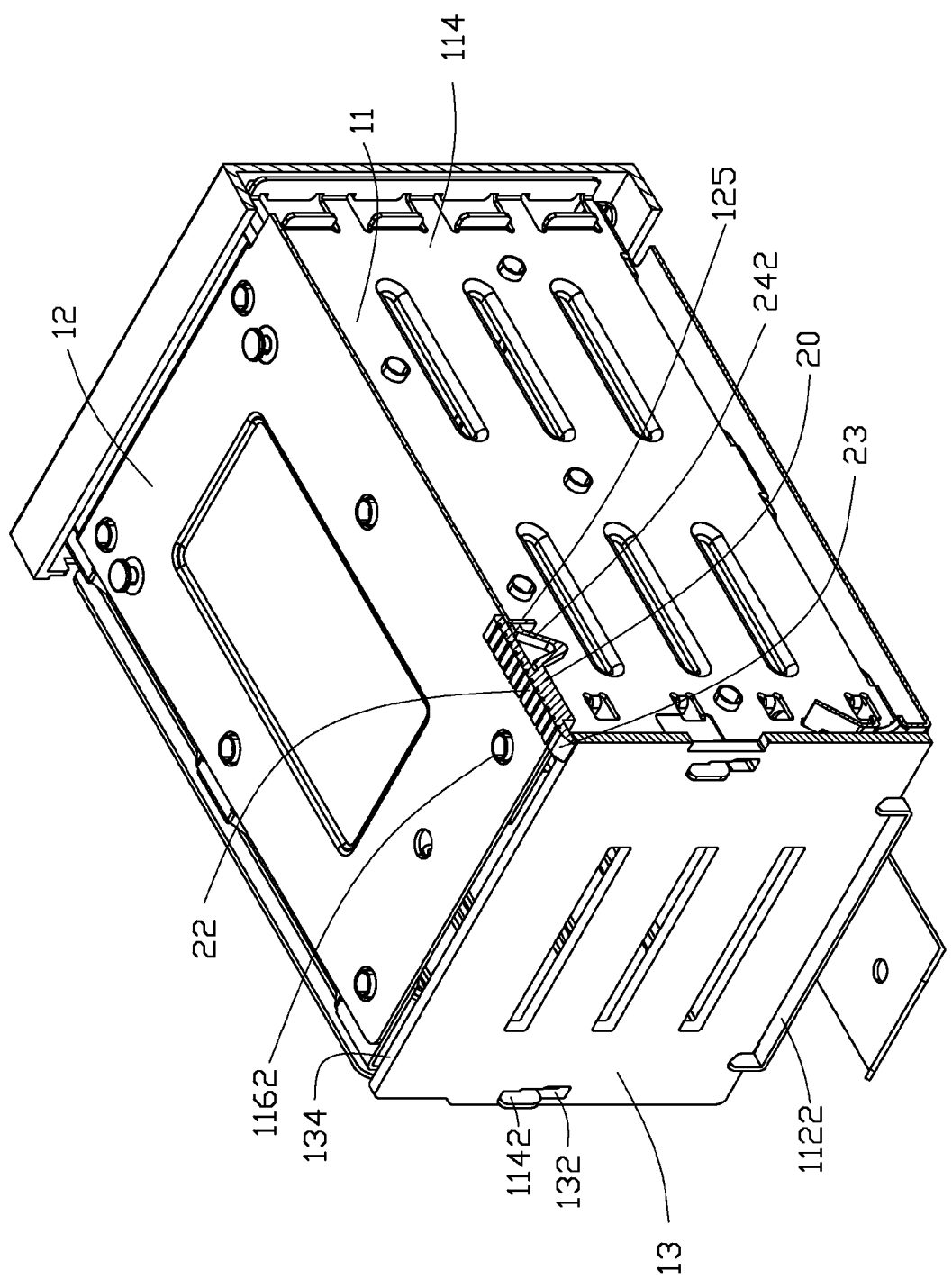
FIG. 5 is an assembled view of the mounting apparatus of FIG. 1.

Referring also to FIG. 3, the securing member 20 includes a sliding portion 21, an operating portion 22 extending upward from the sliding portion 21, a securing portion 23 extending forward from the operating portion 22, and an elastic resisting portion 24 extending backward from the sliding portion 21. Two elastic arms 211 extend forward from the sliding portion 21. Each arm 211 includes a sliding protrusion 212. The sliding protrusion 212 defines a guiding surface 213. The elastic resisting portion 24 includes a flexible portion 241 and a resisting tab 242 extending from the flexible portion 241. The resisting tab 242 is configured to resist against the stopper portion 125. The flexible portion 241 is V-shaped. A plurality of operating protrusions 221 protrudes from the operating portion 22. The securing portion 23 defines an inclining surface 231. Two receiving channels 25 are defined between the sliding portion 21 and the operating portion 22. The receiving channels 25 are configured to receive opposite side edges 1231 of the opening 123 respectively.

Referring also to FIGS. 1 to 5, in assembly, the protrusions 1162 of the mounting portions 116 of the brackets 11 are engaged with the through holes 122 of the top plate 12. The arms 211 of the securing member 20 are aligned with the sliding slots 1144, and the guiding surface 213 of the sliding protrusions 212 of the arms 211 resist between two adjacent side plates 114. The securing member 20 is pushed forward to deform the arms 211. When the sliding protrusions 212 move to be aligned with the sliding slots 1144 respectively, the arms 211 release and enable the sliding protrusions 212 to be received in the sliding slots 1144. At this time, the resisting tab 242 resists against the stopper portion 125. The receiving channels 25 of the securing member 20 receives the opposite side edges 1231 of the opening 123. The hook portions 1143 of the hooks 1142 of the bracket 11 are inserted into the locking openings 132 of the back panel 13 through the wide portions thereof. The back panel 13 is pushed to move towards the bottom plate 112 of the bracket 11 along the guiding edges 1146 of the hooks 1142 in a vertical direction parallel to the back panel 13. The back panel 13 is pushed down continually, until it is inserted into the positioning openings and sandwiched between the positioning tabs 1124 of the extending portion 1122 of the bottom plate 112. Then the shank portions 1145 of the hooks 1142, are slid into the narrow portions of the locking openings 132, and the hook portions 1143 of the hooks 1142 clamp against an outer surface of the back panel 13, thereby preventing the back panel 13 from moving along a first direction perpendicular to the back panel 13. At the same time, the securing portion 23 of the securing member 20 engages with the upper edge 134 of the back panel 13, thereby fixing the back panel 13 to the drive bracket assembly 10, and preventing the back panel 13 from moving along a second direction perpendicular to the first direction. The back panel 13 is thus secured to the drive bracket assembly 10.

In removal of the back panel 13, the operating portion 22 of the securing member 20 is pushed along a direction opposite to the first direction to disengage the securing portion 23 of the securing member 20 from the upper edge 134 of the back panel 13, thereby releasing the back panel 13. The back panel 13 can be accordingly slid along the second direction until the hooks 1142 are positioned in the wide portions of the locking openings 132 of the back panel 13. The back panel 13 is disengaged from the positioning opening of the drive bracket assembly 10, and can thus be removed from the drive bracket assembly 10.

It is to be understood, however, that even though numerous characteristics and advantages of the present invention have been set forth in the foregoing description, together with details of the structure and function of the disclosure, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus, comprising:
a drive bracket assembly;
a back panel mounted to the drive bracket assembly along a first direction; and
a securing member prevents the back panel moving along the first direction, the securing member is capable of sliding along a second direction generally perpendicular to the first direction to a position so that the back panel is capable of moving along the first direction;
wherein the drive bracket assembly defines two sliding slots, and the securing member comprises two arms engaging with the two sliding slots; and the drive bracket assembly comprises two drive brackets, each drive bracket comprises two parallel side plates, the two sliding slots are defined in two adjacent side plates of the two drive brackets respectively, and the securing member is slidably mounted between the two adjacent side plates.

2. The mounting apparatus of claim 1, wherein the securing member comprises an elastic resisting portion, and the drive bracket assembly comprises a stopper portion configured to abut the elastic resisting portion; wherein the elastic resisting portion is elastically deformed when the securing member slides to the position.

3. The mounting apparatus of claim 2, wherein the elastic resisting portion comprises a flexible portion and a resisting tab extending from the flexible portion; and the resisting tab is configured to abut the stopper portion.

4. The mounting apparatus of claim 3, wherein the flexible portion is V-shaped.

5. The mounting apparatus of claim 1, wherein each arm defines a guiding surface, the guiding surface configured to guiding the arm to move in the corresponding sliding slot easily along the second direction.

6. The mounting apparatus of claim 1, wherein the drive bracket assembly further comprises a top panel connected to the two drive brackets, the top panel defines an opening between the two adjacent side plates; the opening defines two opposite side edges, and the securing member defines two receiving channels configured to receive the two opposite side edges of the opening.

7. The mounting apparatus of claim 1, wherein the securing member comprises a securing portion, and the securing portion blocks the back panel when the back panel is assembled.

8. The mounting apparatus of claim 7, wherein the securing portion defines an inclining surface, the inclining surface configured to be urged by the back panel to move to the position when the back panel is mounted to the drive bracket assembly along the first direction.

9. A mounting apparatus, comprising:
a drive bracket assembly comprising a hook in a rear edge of the drive bracket assembly;
a back panel comprising a locking opening configured to engage with the hook, the hook is configured to prevent the back panel from moving along a first direction that is perpendicular to the back panel; and
a securing member slidably mounted on the drive bracket assembly along the first direction, and the securing member prevents the back panel from moving along a second direction perpendicular to the first direction;
the securing member comprises an elastic resisting portion, and the drive bracket assembly comprises a stopper portion configured to abut the elastic resisting portion; wherein the elastic resisting portion is elastically deformed when the securing member slides along the first direction to a position so that the back panel is capable of moving along the second direction;
the elastic resisting portion comprises a flexible portion and a resisting tab extending from the flexible portion; and the resisting tab is configured to abut the stopper portion; and
the flexible portion is V-shaped.

10. The mounting apparatus of claim 9, wherein the drive bracket assembly defines two sliding slots, and the securing member comprises two arms received in the two sliding slots.

11. The mounting apparatus of claim 10, wherein the drive bracket assembly comprises two drive brackets, and each drive bracket comprises two parallel side plates; the two sliding slots are defined in two adjacent side plates of the two drive brackets respectively; and the securing member is slidably mounted between the two adjacent side plates.

12. The mounting apparatus of claim 11, wherein each arm defines a guiding surface, and the guiding surface is configured to guide the arm to move in the corresponding sliding slot along the second direction.

13. The mounting apparatus of claim 11, wherein the drive bracket assembly further comprises a top panel connected to the two drive brackets, the top panel defines an opening between the two adjacent side plates; the opening defines two opposite side edges, and the securing member defines two receiving channels that receive the two opposite side edges of the opening.

14. The mounting apparatus of claim 9, wherein the securing member comprises a securing portion, and the securing portion blocks the back panel when the back panel is assembled.

15. The mounting apparatus of claim 14, wherein the securing portion defines an inclining surface, the inclining surface configured to be urged by the back panel to move to the position, when the back panel is mounted to the drive bracket assembly along the second direction.

16. A mounting apparatus, comprising:
a drive bracket assembly, the drive bracket assembly comprises two drive brackets and a top panel mounted to the two drive brackets, and the top panel defines an opening between the two drive brackets; the opening defines two opposite side edges;

a back panel mounted to the drive bracket assembly along a first direction; and a securing member, the securing member is slidably mounted between the two drive brackets; the securing member comprises an operating portion, a securing portion extending from the operating portion, the securing portion prevents the back panel from moving along the first direction; the securing member defines two receiving channels that receive the two opposite side edges of the opening; and the operating portion is configured to be operated to enable the securing member to slide along a second direction generally perpendicular to the first direction to a position so that the back panel is capable of moving along the first direction.

17. The mounting apparatus of claim 16, wherein the securing member comprises an elastic resisting portion, and the drive bracket assembly comprises a stopper portion configured to abut the elastic resisting portion; wherein the elastic resisting portion is elastically deformed when the securing member slides to the position; the elastic resisting portion comprises a flexible portion and a resisting tab extending from the flexible portion; and the resisting tab is configured to abut the stopper portion; and the flexible portion is V-shaped.

18. The mounting apparatus of claim 16, wherein each drive bracket comprises two parallel side plates; two sliding slots are defined in two adjacent side plates of the two drive brackets; and the securing member comprises two arms received in the two sliding slots.

\* \* \* \* \*